Figure 1:
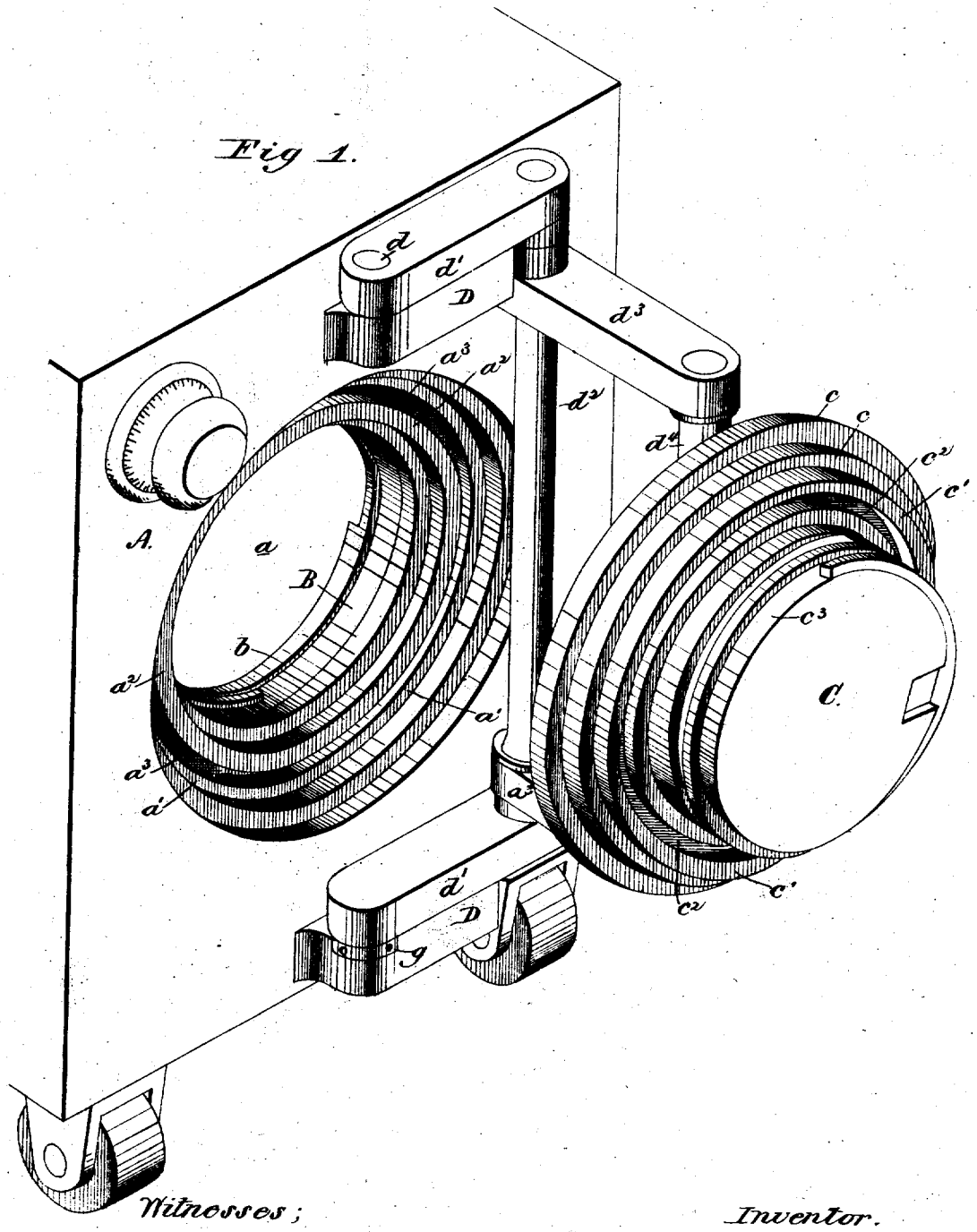

2 Sheets—Sheet 1.

P. F. KING,

Assignor to Beard & Brothers.

DOORS AND HINGES FOR BURGLAR-PROOF SAFES.

No. 7,802. Reissued July 17, 1877.

Witnesses;

Harry C. Clark

J. H. Crudham

Inventor.

P. F. King by H. W. Readle & C.

Attys.

2 Sheets—Sheet 2.
P. F. KING,
Assignor to Beard & Brothers.
DOORS AND HINGES FOR BURGLAR-PROOF SAFES.
No. 7,802. Reissued July 17, 1877.
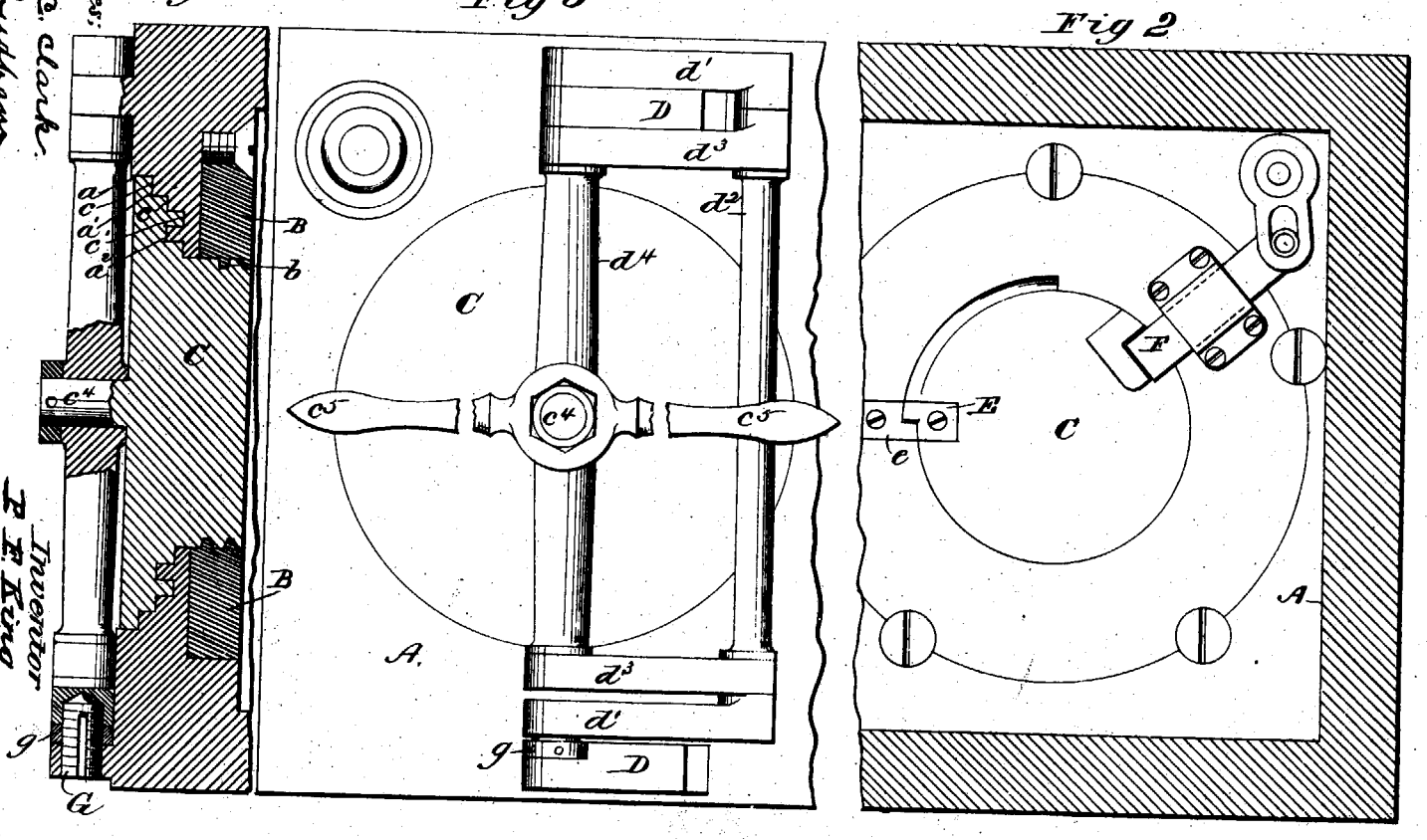
Witnesses;
Harry C. Clark.
J. H. Chudham
Inventor
P. F. King
by H. W. Beadle & Co
Attys.

UNITED STATES PATENT OFFICE.

PHINEAS F. KING, OF ST. LOUIS, MO., ASSIGNOR TO BEARD & BROTHER.

IMPROVEMENT IN DOORS AND HINGES FOR BURGLAR-PROOF SAFES.

Specification forming part of Letters Patent No. 153,348, dated July 21, 1874; reissue No. 7,802, dated July 17, 1877; application filed November 14, 1876.

DIVISION B.

*To all whom it may concern:*

Be it known that I, PHINEAS F. KING, of St. Louis, in the county of St. Louis and State of Missouri, have invented an Improvement in Safes, Vaults, &c., of which the following is a specification:

This invention relates to that class of safes which are provided with round doors having peripheral screw-threads, by means of which, and corresponding threads on the casing, the door may be screwed into place to close the safe; and it consists, mainly, first, in the combination of an independent internal ring, having screw-threads with the casing of the safe and the screw-threaded door; and, second, in the special construction of the hinge mechanism for supporting the door, all of which will be fully described hereinafter.

In the drawings, Figure 1 represents a perspective view of my improved safe with the door open; Fig. 2, a partial rear elevation of the front wall of the safe; Fig. 3, a partial front elevation with the door closed; and Fig. 4, a central sectional elevation.

To enable others skilled in the art to make and use my invention, I will now proceed to describe fully its construction and manner of operation.

A represents the casing of the safe, constructed of any well-known material, and in any well-known manner.

*a* represents a circular opening of any proper size, the face of which consists of a series of inwardly-converging steps $a^1$ $a^1$, as shown.

$a^2$ represents an annular projection, and $a^3$ a recess, consequently formed between the projection $a^2$ and the adjacent step $a^1$, the purpose of which will be hereinafter explained.

B represents an independent ring, which is secured around the opening to the inner surface of the safe, as shown.

*b* represents screw-threads, formed upon the inner circumference of the ring, as shown.

C represents the door, constructed generally in any well-known manner, but preferably formed of several independent metal disks, varying in character and hardness. This corresponds in size, of course, with the opening which it is designed to close, and it is provided with a series of diverging steps, *c c*, adapted to engage with those of the casing, as shown.

$c^1$ represents an annular projection, and $c^2$ a recess, consequently formed between the projection $c^1$ and the adjacent step *c*, as shown, which projection and recess, it will be observed, are adapted to engage with the corresponding recess and projection on the casing, as shown.

$c^3$ represents a projecting portion upon the inner face of the door, which is provided with screw-threads, adapted to engage with the screw-threads of the inner ring B, as shown.

$c^4$ represents a shaft or spindle centrally attached to the door, which is supported in the relatively fixed bearings in the vertical bar $d^4$, as shown.

$c^5$ represents a cross-bar or handle, by means of which the shaft $c^4$ may be revolved for the purpose of screwing up or unscrewing the door.

D D represent brackets projecting from the front wall of the safe, which are provided, near their inner ends, with the vertical studs or pins *d* G, as shown.

$d^1$ $d^1$ represent radius-bars, loosely held at their inner ends by the pivot studs or pintles *d* G, and united at their outer ends, by means of a proper socket, to the ends of the vertical bar $d^2$, as shown.

$d^3$ $d^3$ represent radius-bars, rigidly attached at their outer ends, by means of socket-bearings, to the vertical bar $d^2$, and pivoted at their inner ends to the extremities of the vertical bar $d^4$, as shown.

The vertical bars $d^2$ $d^4$ and the radius-bars $d^3$ $d^3$ constitute a frame by which the door is carried, which frame is hinged at one side to the radius-bars $d^1$ $d^1$, these latter being themselves hinged to the brackets, as shown.

E, Fig. 2, represents a stop-piece projecting from the inner edge of the door, which consists of a piece of steel inserted in place.

*e* represents a corresponding stop-piece projecting from the inner edge of the ring B, which is formed similarly to the piece E.

F represents a bolt, which is adapted to engage, when desired, with a recess, for the purpose of locking the door to prevent its revolution.

This bolt, it will be observed, is independent of the lock-spindle, being loosely connected thereto by a pin which engages with a proper slot in the lever-arm extending from the spindle.

G, Fig. 4, represents a threaded stud resting in the lower bracket, which is provided with a spline for holding it against revolution.

*g* represents a nut upon the stud, which is interposed between the upper face of the bracket and the lower face of the radius-bar which rests upon the stud. If desired, the adjusting mechanism, instead of being located at this place, may be located at the lower end of bar $d^4$.

By properly turning the nut *g* the stud may be raised to compensate for any wear or sag in the supporting mechanism which carries the door.

The operation will be readily understood from the foregoing description.

The door, when opened, may be closed by first swinging it to place and then revolving its supporting-spindle until the stops arrest further movement. When in this closed position the recess of the door will coincide with the locking-bolt, so that the latter, if desired, may be shot into place to fasten the door.

The door, it will be observed, by means of the peculiar construction of the supporting devices employed, may be caused, in entering and leaving the opening, to move in planes parallel to the face of the door, and also in a line at right angles to the perpendicular diameter of the opening.

The parallel movement results from the swinging movement of the radius-bars $d^1$ $d^1$ upon their pivots, by means of which the hinge-point of the frame carrying the door is changed, to compensate for the movement of the frame itself.

The movement upon a central line, without tendency to press in a lateral direction, results from the fact that the radius-bars move upon opposite arcs of equal circles, so that the lateral movement relative to the center line of the safe, which results from the swinging of the door in the arc of one circle, is compensated for by a corresponding movement of the hinge in the arc of an opposite circle of equal area.

By means of this peculiar construction the door may be properly presented to the opening, and may be caused to enter the same without tendency to jam. When the door is closed, its face, it will be observed, lies sunk within the plane of the face of the casing, so that no part projects outward to give opportunity for the attachment of burglars' tools.

The stop devices limit the movement of the door so that it is impossible to jam the threads, no matter how violently it may be screwed to place.

The brackets D D, it will be observed, furnish extended bearings for the radius-bars, so that they are not subjected to undue strain.

Some of the advantages of construction are as follows: By means of the independent ring, composed of solid metal, it is possible to cut a perfect screw-thread without difficulty, a result practically impossible when layers of mixed metal are employed.

This independent ring, also, in connection with the door, when the latter is closed, serves as a clamp to bind the plates of the casing firmly together, and give increased strength to this portion of the safe.

By the employment of the peculiar hinge devices, the door, in entering or leaving the opening, can be made to move in planes parallel to the face of the door, and, also, in a line at right angles to the vertical diameter of the opening.

By providing the shaft of the door with a bearing that is relatively fixed, the construction is simplified, and a more perfect result is obtained.

The door being supported in a balanced position upon a central vertical axis, it may be oscillated upon this axis to bring it into place, if it should not be perfectly parallel with the face of the safe.

Having thus fully described my invention, what I claim as new, and desire to secure by Letters Patent, is—

1. In combination with the safe-body A, and the screw-threaded door, an independent internal ring, having screw-threads, substantially as described.

2. In combination with the wall of the safe and the door C, the radius-bars $d^1$ $d^3$, held in different horizontal planes, and adapted, when closed, to lie against the wall of the safe, in the same vertical plane, as described.

3. In combination with the vertical bar $d^4$, and the door C, centrally attached thereto, the radius-bars $d^1$ $d^3$, adapted to move in opposite arcs of equal circles, substantially as described.

4. In combination with the radius-bars, the bracket D, having an extended bearing, as and for the purpose set forth.

5. In combination with a threaded door and threaded casing, radius-bars adapted to move in opposite arcs of equal circles, and a bar, $d^4$, attached to the central axis of the door, as described.

6. The combination of the following elements: the vertical bars $d^2$ $d^4$, the radius-bars $d^1$ $d^3$, carrying the door, the bracket D, and the adjusting mechanism for taking up the sag, substantially as described.

7. In combination with a round screw-door, having a central axis, a central vertical axis, $d^4$, adapted, substantially as described, to hold the door in a balanced position and permit it to oscillate to find its place in the casing, as set forth.

8. In combination with a round-screw door, having a central axis fixed in its bearing, mechanism connecting the door to the safe, substantially as described, adapted to carry the door in planes parallel to the face of the safe, as set forth.

9. A screw-door adapted, substantially as described, to move in planes parallel to the face of the safe, and to oscillate upon a central vertical axis, as set forth.

In testimony whereof I have hereunto set my hand.

Witnesses: PHINEAS F. KING.

WILLIAM W. HERTHEL,

CHAS. F. MEISNER.